United States Patent
Bae et al.

(10) Patent No.: US 8,401,098 B2
(45) Date of Patent: Mar. 19, 2013

(54) DIGITAL DIFFERENTIAL SIGNAL TRANSMITTER FOR LOW SUPPLY VOLTAGE

(75) Inventors: Jun Hyun Bae, Pohang-si (KR); Hong June Park, Pohang-si (KR)

(73) Assignee: Postech Academy Industry Foundation, Pohang-Si, Gyeongsangbuk-Do (KR)

( * ) Notice: Subject to any disclaimer, the term of this patent is extended or adjusted under 35 U.S.C. 154(b) by 895 days.

(21) Appl. No.: 12/503,048

(22) Filed: Jul. 14, 2009

(65) Prior Publication Data

US 2010/0284489 A1    Nov. 11, 2010

(30) Foreign Application Priority Data

May 6, 2009    (KR) .................. 10-2009-0039419

(51) Int. Cl.
*H04K 1/10* (2006.01)
*H04B 3/46* (2006.01)
*H03K 7/08* (2006.01)

(52) U.S. Cl. .............. 375/260; 375/226; 327/175
(58) Field of Classification Search .............. 375/226, 375/260; 327/175
See application file for complete search history.

(56) References Cited

U.S. PATENT DOCUMENTS

| | | | | |
|---|---|---|---|---|
| 4,814,896 A * | 3/1989 | Heitzman et al. | ............. | 386/239 |
| 6,292,901 B1 * | 9/2001 | Lys et al. | ....................... | 713/300 |
| 6,356,129 B1 * | 3/2002 | O'Brien et al. | ............... | 327/175 |
| 6,364,541 B1 * | 4/2002 | Nesnidal et al. | ................ | 385/92 |
| 2004/0174570 A1 * | 9/2004 | Plunkett et al. | ............. | 358/3.13 |
| 2005/0111537 A1 * | 5/2005 | Sunter et al. | ................... | 375/226 |
| 2005/0116752 A1 * | 6/2005 | Chan et al. | .................... | 327/170 |
| 2007/0176659 A1 * | 8/2007 | Gomm | .......................... | 327/175 |
| 2008/0036509 A1 * | 2/2008 | Jang | .............................. | 327/141 |
| 2009/0002042 A1 * | 1/2009 | Rausch et al. | ................ | 327/175 |

* cited by examiner

*Primary Examiner* — David C. Payne
*Assistant Examiner* — Sarah Hassan
(74) *Attorney, Agent, or Firm* — Kile Park Goekjian Reed & McManus PLLC (57) ABSTRACT

A digital differential signal transmitter circuit for a low supply voltage. A phase correction circuit for correcting digital signals transmitted through two signal paths in such a way as to have a phase relationship of differential signals and duty cycle correction circuits for correcting the digital signals in such a way as to maintain signal integrity in spite of changes in process, supply voltage and temperature are installed on the two signal paths so that the distortion of digital differential signals is compensated for. Power consumption at a final output section of the transmitter circuit is reduced. Impedances of the transmitter circuit and transmission lines are matched so that the transmitter circuit can operate insensitively with respect to operation circumstances.

20 Claims, 8 Drawing Sheets

DIGITAL DIFFERENTIAL SIGNAL TRANSMITTER FOR LOW SUPPLY VOLTAGE

BACKGROUND OF THE INVENTION

1. Field of the Invention

The present invention relates to a digital differential signal transmitter for operation under a low supply voltage, and more particularly, to a digital differential signal transmitter circuit for a low supply voltage wherein a phase correction circuit for correcting digital signals transmitted through two signal paths in such a way as to have a phase relationship of differential signals and duty cycle correction circuits for correcting the digital signals in such a way as to maintain signal integrity in spite of changes in process, supply voltage and temperature are installed on the two signal paths so that the distortion of digital differential signals is compensated for, wherein power consumption at a final output section of the transmitter circuit is reduced, and wherein impedances of the transmitter circuit and transmission lines are matched so that the transmitter circuit can operate insensitively with respect to operation circumstances.

2. Description of the Related Art

In general, differential signals mean that signals having the same information have a phase difference of 180°. These differential signals should have a phase difference of 180° while being transmitted through a circuit and should be maintained in such a way as to conserve the same information between the two signals.

In the case of an analog circuit, since the transmission of differential signals is implemented through a circuit having the form of a differential pair, the phase difference between two signals and the information of the signals can be easily maintained.

However, in the case of a digital circuit, it is difficult to ensure the signal integrity of the differential signals, except a CML (current mode logic) circuit which is configured to toggle with a preset amplitude or a preset swing range on the basis of a predetermined DC level or an average level determined by a certain reference. Nevertheless, in the case of the CML circuit, due to the structural characteristics thereof, limitations exist in decreasing a supply voltage so as to reduce power consumption, and the circuit itself consumes a substantial amount of power, whereby it is difficult to use the CML circuit unless a circuit dedicated for high speed operation is needed. Therefore, problems are caused in that the CML circuit is difficult to be used in a wired digital differential signal transmitter for operation under a lower supply voltage.

Accordingly, in a conventional wired digital differential signal transmitter, a CMOS (complementary metal-oxide semiconductor) circuit is generally used. That is to say, in the case of the CMOS circuit, since all MOS elements in the circuit operate as switches and there is no static power consumption, the CMOS circuit is appropriate for the design of a circuit for operation under a low supply voltage and is therefore used in the conventional wired digital differential signal transmitter.

Figure 1:
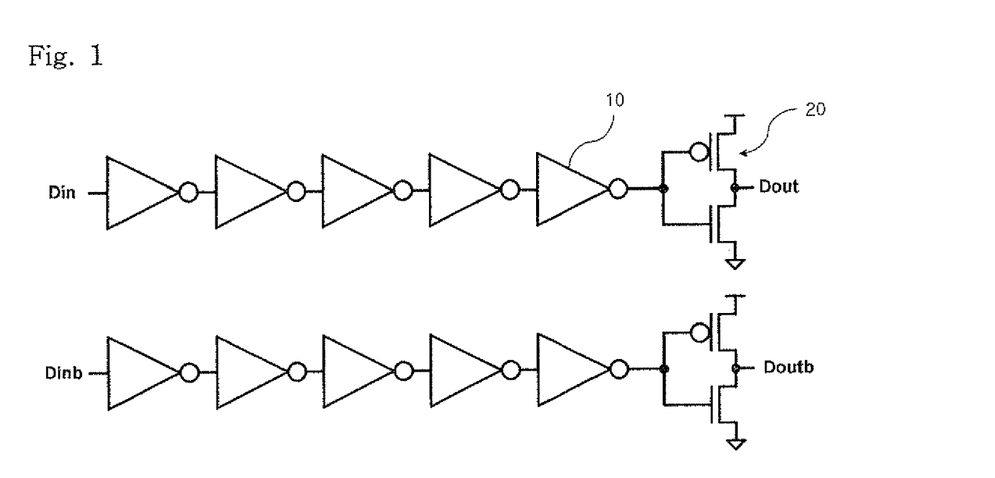
FIG. 1 is a view illustrating the configuration of a conventional CMOS type wired digital differential signal transmitter.

FIG. 1 is a view illustrating the configuration of a conventional CMOS type wired digital differential signal transmitter.

Referring to FIG. 1, a conventional CMOS type wired digital differential signal transmitter is configured to transmit input differential signals Din and Dinb using CMOS inverters 20 so as to operate output driving inverters 10. At this time, in the conventional CMOS type wired digital differential signal transmitter, because there is no interference between two signal paths for transmitting the differential signals, the operational characteristics of the signal path of Din and the signal path of Dinb are likely to vary by a change in process, supply voltage, operation temperature, etc.

Hence, while the input differential signals Din and Dinb have the characteristics of differential signals, since the transmitter cannot maintain the signal integrity, a problem is caused in that output signals Dout and Doutb do not have the characteristics of differential signals.

Figure 2:
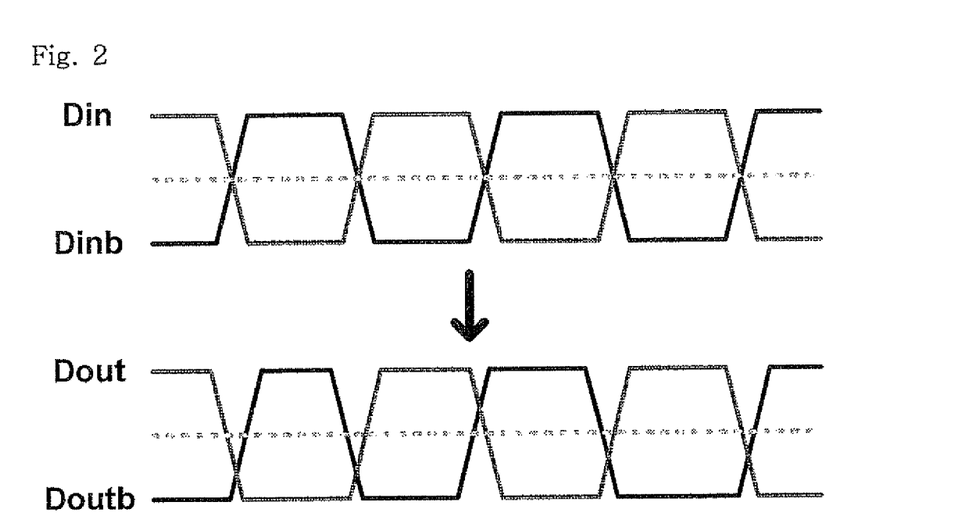
FIG. 2 is a view illustrating a state in which input differential signals are outputted by being distorted in the conventional transmitter.

FIG. 2 is a view illustrating a state in which input differential signals are outputted by being distorted in the conventional transmitter.

Referring to FIG. 2, since the transmitter cannot maintain the signal integrity even under a change in process, supply voltage, operation temperature, etc., the input differential signals are distorted. Therefore, it is to be understood that the transmitter cannot but transmit the differential signals distorted in this way as output differential signals.

Also, as can be readily seen from FIG. 2, if the signals to be transmitted by the transmitter are distorted and lose the characteristics of differential signals, the advantages of differential signals which operate insensitively with respect to noise cannot be rendered, and the probability of signal transmission errors to occur increases.

Recently, in order to solve these problems caused in the conventional wired digital differential signal transmitter, improved type digital differential signal transmitters of which characteristics are ameliorated in terms of signal distortion have been proposed in the art.

Figure 3:
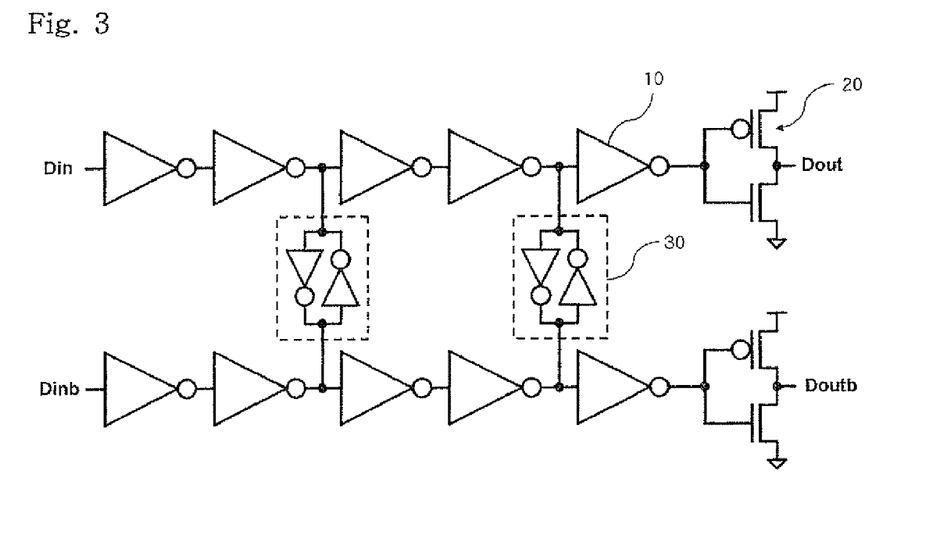
FIG. 3 is a view illustrating the configuration of an improved type digital differential signal transmitter which can solve the distortion of signals in the transmitter shown in FIG. 1.

FIG. 3 is a view illustrating the configuration of an improved type digital differential signal transmitter which can solve the distortion of signals in the transmitter shown in FIG. 1.

Referring to FIG. 3, in order to solve the problems caused in the conventional digital differential signal transmitter in terms of differential signal integrity, an improved digital differential signal transmitter includes one or more cross-coupled inverters 30 which are arranged between two signal paths for transmitting input differential signals Din and Dinb using CMOS inverters 20 such that the cross-coupled inverters 30 can correct the signals distorted during passage through a plurality of inverters 10 to approach differential signals.

Nonetheless, in the improved type digital differential signal transmitter, the cross-coupled inverters 30 arranged between the two signal paths can cause short-circuit current between a supply voltage (VDD) and a ground (GND) so that power consumption increases. Moreover, since the correction of the input differential signals is influenced by a change in the driving capability of the cross-coupled inverters, a signal correction degree can vary depending upon a change in process, supply voltage, operation temperature, etc.

Further, in the case where the driving capability of the cross-coupled inverters are too great, the cross-coupled inverters can operate in such a way as to disturb the change of the input differential signals Din and Dinb between the two signal paths, whereby the high speed operation of the transmitter is likely to be adversely influenced.

In addition, due to the fact that the conventional transmitters shown in FIGS. 1 and 3 have a final output section which has a push-pull structure of a PMOS and an NMOS, limitations exist in decreasing a supply voltage of the final output section so as to reduce power consumption.

As a consequence, the conventional CMOS digital differential signal transmitters cannot sufficiently compensate for the distortion of differential signals due to a change in the manufacturing process of a chip, supply voltage, operation temperature, etc., whereby the performance of the transmitters can deteriorate. In particular, under a low supply voltage, problems are still caused in that the transmitters sensitively react on the change of the operational circumstances.

SUMMARY OF THE INVENTION

Accordingly, the present invention has been made in an effort to solve the problems occurring in the related art, and an object of the present invention is to provide a digital differential signal transmitter circuit for a low supply voltage wherein a phase correction circuit and duty cycle correction circuits are installed on two signal paths such that digital signals transmitted through the two signal paths have a phase difference of 180° and a duty cycle of 50% while having the same signal information, so that the distortion of digital differential signals is compensated for, wherein a final output section of the transmitter circuit comprises switches composed of only NMS transistors so that power consumption is reduced, and wherein impedances of the transmitter circuit and transmission lines are matched so that the transmitter circuit can operate insensitively with respect to operation circumstances.

In order to achieve the above object, according to an aspect of the present invention, there is provided digital differential signal transmitter circuit for a low supply voltage, comprising signal selection switches composed of multiplexers which are respectively installed on two signal paths to select and output to the respective signal paths any ones of input differential signals and clock signals; a differential phase correction circuit arranged between the two signal paths to be inputted with signals outputted from the two signal paths, delay output timing and correct a phase difference between two signals; duty cycle correction circuits configured to detect edges of signals transmitted from the respective signal paths after phase correction is implemented, generate pulses, and control a switch for increasing and decreasing an output signal by the pulses so that duty cycles of signals outputted from the respective signal paths are corrected to be constant; and a final output section configured to match an impedance of an output driver using a reference resistor having the same impedance as transmission lines for transmitting the input differential signals to a receiver, and output the input differential signals corrected in duty cycles to the transmission lines.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENT

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
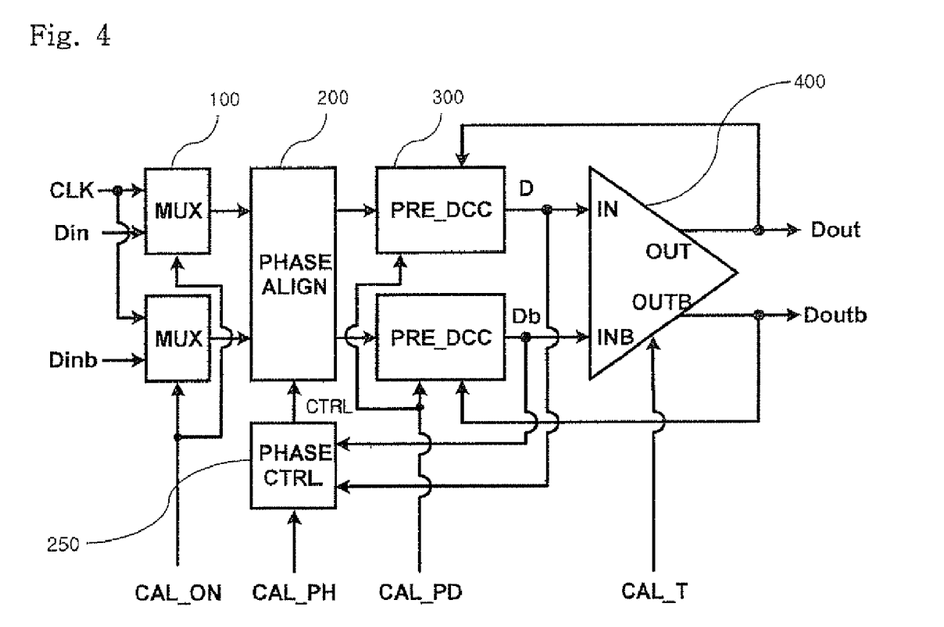
FIG. 4 is a view illustrating the configuration of a wired digital differential signal transmitter circuit in accordance with an embodiment of the present invention.

FIG. 4 is a view illustrating the configuration of a wired digital differential signal transmitter circuit in accordance with an embodiment of the present invention.

Referring to FIG. 4, a wired digital differential signal transmitter circuit in accordance with an embodiment of the present invention includes signal selection switches 100, a differential phase correction circuit 200, duty cycle correction circuits 300, and a final output section 400. The wired digital differential signal transmitter circuit is configured to have input differential signals Din and Dinb, a correction function activation signal CAL_ON, a differential phase correction activation signal CAL_PH, a duty cycle correction activation signal CAL_PD and an impedance matching activation signal CAL_T as input signals and output differential signals Dout and Doutb as output signals.

The signal selection switches (MUX) 100 are respectively installed on two signal paths and comprise multiplexers for selecting signals to be outputted. The signal selection switches (MUX) 100 are configured to select and output any one of the input differential signals Din and Dinb and a clock signal CLK in response to the correction function activation signal CAL_ON.

The signal selection switches (MUX) 100 are configured to select the clock signal CLK as an input to the transmitter circuit in response to the correction function activation signal CAL_ON while the input differential signals Din and Dinb are corrected to be transmitted as the output differential signals Dout and Doutb. By this signal selection in the signal selection switches (MUX) 100, the clock signal CLK is transmitted to the two signal paths as the same signal while correcting the differential signals.

The differential phase correction circuit (PHASE ALIGN) 200 receives as inputs the signals respectively outputted from the two signal paths. The differential phase correction circuit (PHASE ALIGN) 200 is configured to correct a phase difference of the signals transmitted through the two signal paths while delaying output timing by a control code CTRL outputted from a phase controller (PHASE CTRL) 250.

According to this fact, when the differential phase correction circuit (PHASE ALIGN) 200 is activated in its correction function, after the clock signal CLK is outputted from the signal selection switches (MUX) 100, the differential phase correction circuit (PHASE ALIGN) 200 operates and corrects a phase, in the same principle as in a digital delay locked loop, using control codes CTRL and CTRLB generated by the phase controller (PHASE CTRL) 250 in response to the differential phase correction activation signal CAL_PH such that a phase difference of the signals transmitted through the two signal paths becomes 180°. Therefore, correction is made such that, even when the signals outputted from the signal selection switches (MUX) 100 are changed to the differential signals Din and Dinb, the differential signals transmitted through the two signal paths can have a phase difference of 180°.

The duty cycle correction circuits (PRE_DCC) 300 receive as inputs the signals which are outputted from the differential phase correction circuit (PHASE ALIGN) 200 after having completely undergone phase correction. The duty cycle correction circuits (PRE_DCC) 300 correct and output the inputted signals in response to the duty cycle correction activation signal CAL_PD such that pre-drivers on the two signal paths can maintain the signal integrity of the differential signals even though a process, a supply voltage, a temperature, etc. are changed.

In the conventional wired digital differential signal transmitter, since the logic threshold of pre-drivers changes by the change in process, supply voltage, temperature, etc., the signal integrity of the differential signals cannot be ensured. In the present invention, the duty cycle correction circuits (PRE_DCC) 300 correct the duty cycles of the signals inputted through the respective signal paths such that the duty cycles of the signals outputted from the respective signal paths become 50%.

The duty cycle correction circuits (PRE_DCC) 300 are configured such that output signals D and Db from the duty cycle correction circuits (PRE_DCC) 300 to the respective signal paths are fed back to the phase controller (PHASE CTRL) 250 so that the correction of a phase difference is confirmed and can be reflected on the generation of the control signal CTRL.

The final output section 400 includes an impedance matching calibration circuit (IMPEDANCE MATCHING CALIBRATION) for impedance matching with transmission lines and an output driver (OUTPUT DRIVER) which is composed of only NMOS transistors to transmit impedance-calibrated differential signals using a low supply voltage.

According to this fact, in the final output section 400, the impedance matching calibration circuit implements impedance matching with the transmission lines in response to the impedance matching activation signal CAL_T, and the output driver composed of only NMOS transistors transmits the output differential signals Dout and Doutb using the low supply voltage independently of other circuits so that power consumption is reduced.

Figure 5:
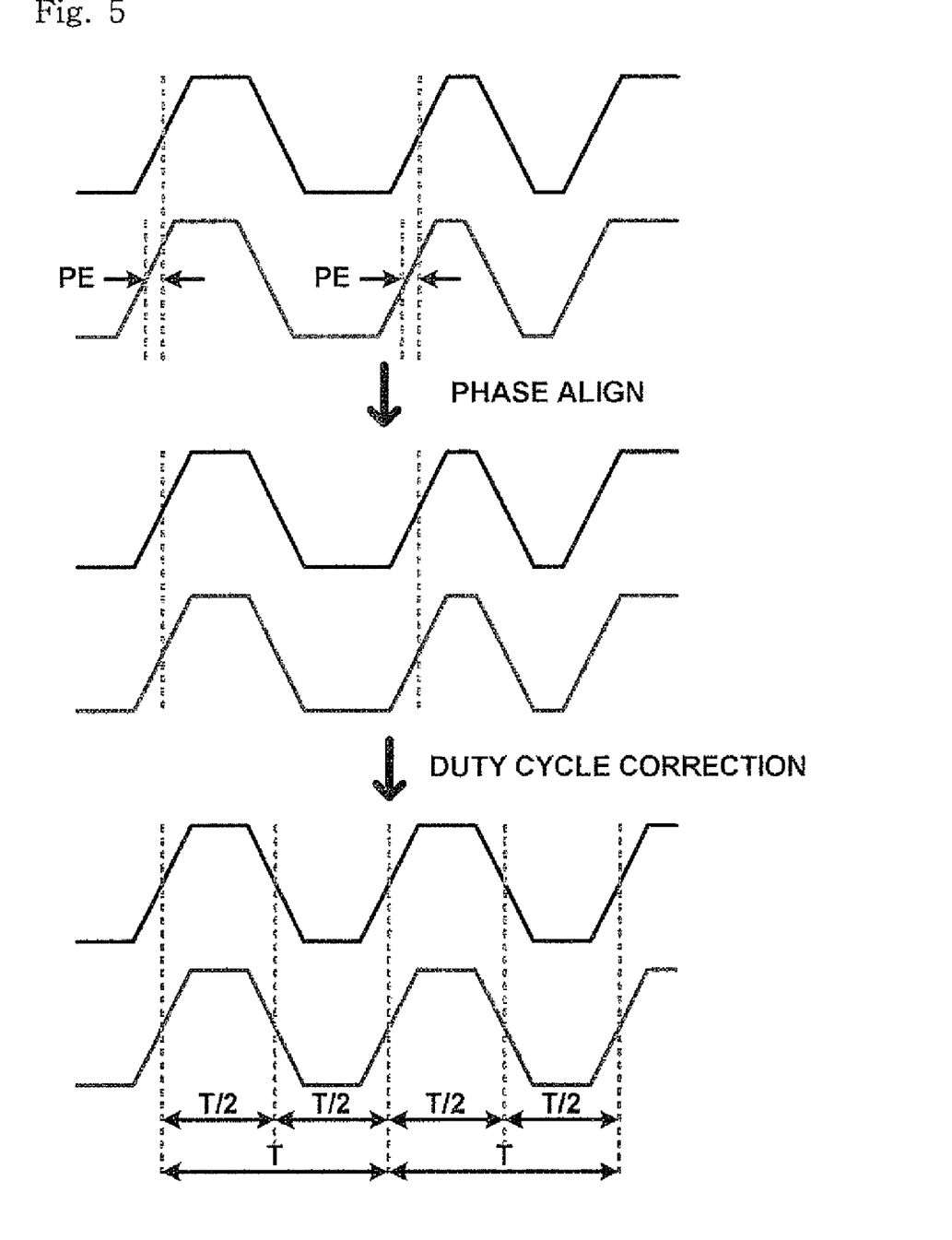
FIG. 5 is a timing diagram illustrating the operation of the wired digital differential signal transmitter circuit in accordance with the embodiment of the present invention.

FIG. 5 is a timing diagram illustrating the operation timing of the wired digital differential signal transmitter circuit in accordance with the embodiment of the present invention.

Referring to FIG. 5, in the conventional wired digital differential signal transmitter, when a clock signal is inputted to two signal paths, as shown in a first timing diagram, phase errors PE are caused between two signals. Therefore, as the drivability of the respective signal paths changes, distortion of the duty cycles of the signals occurs.

In the present invention, in order to solve the problems caused by the fact that signal integrity cannot be ensured due to the phase errors PE and the distortion of duty cycles, as shown in a second timing diagram, phase correction is implemented on the two signal paths by the differential phase correction circuit (PHASE ALIGN) so that the phase errors PE can be removed.

Then, as shown in a third timing diagram, the drivability of the two signal paths is corrected by the duty cycle correction circuits (PRE_DCC) so that the duty cycles of the outputs of the respective signal paths become 50%.

If the phase correction and duty cycle correction are completed in this way after the clock signal CLK is inputted from the signal selection switches (MUX) 100 in response to the correction function activation signal CAL_ON, when the input differential signals Din and Dinb are then inputted from the signal selection switches (MUX) 100, it is possible to correct differential signals which lost signal integrity due to a change in process, supply voltage, temperature, etc.

Figure 6:
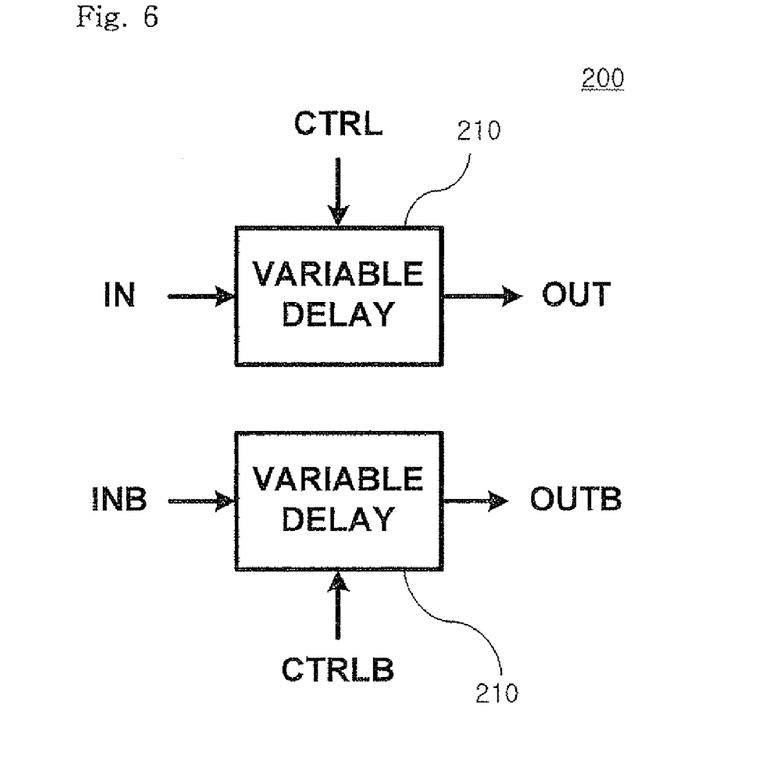
FIG. 6 is a view illustrating the configuration of differential phase correction circuit of the wired digital differential signal transmitter circuit in accordance with the embodiment of the present invention.

FIG. 6 is a view illustrating the configuration of a differential phase correction circuit of the wired digital differential signal transmitter circuit in accordance with the embodiment of the present invention.

Referring to FIG. 6, the differential phase correction circuit (PHASE ALIGN) 200 includes variable delays (VARIABLE DELAY) 210 which are inputted with and delay signals IN and INB outputted from the signal selection switches (MUX) 100 on the two signal paths, respectively.

One of the variable delays (VARIABLE DELAY) 210 adjusts a delay time of the input signal IN by the control code CTRL as the output of the phase controller (PHASE CTRL) 250 shown in FIG. 4 and outputs an output signal OUT, and the other of the variable delays (VARIABLE DELAY) 210 adjusts a delay time of the input signal INB by the control code CTRLB having complementariness with respect to the control code CTRL and outputs an output signal OUTB.

Figure 7:
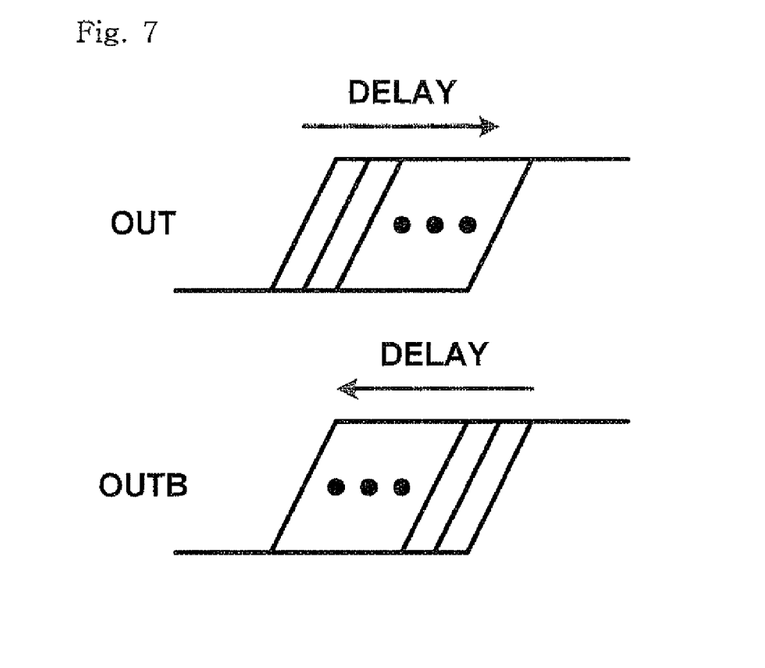
FIG. 7 is a timing diagram illustrating the operation of the differential phase correction circuit according to the present invention.

FIG. 7 is a timing diagram illustrating the operation timing of the differential phase correction circuit of the wired digital differential signal transmitter circuit in accordance with the embodiment of the present invention.

Referring to FIG. 7, the delay time (DELAY) of the output signal OUT is increased by the control code CTRL which monotonously increases, and the delay time (DELAY) of the output signal OUTB is decreased by the control code CTRLB which has complementariness with respect to the control code CTRL.

As the control code CTRL and the complementary control code CTRLB respectively adjust the delay time of the clock signal CLK which is transmitted through the respective signal paths, a phase difference between the output signals OUT and OUTB in the specific control code CTRL is minimized. The differential phase correction circuit (PHASE ALIGN) 200 can apply the specific control code CTRL for minimizing the phase difference between the output signals OUT and OUTB to the differential input signals Din and Dinb in the same manner so that the phase errors PE are removed.

Figure 8:
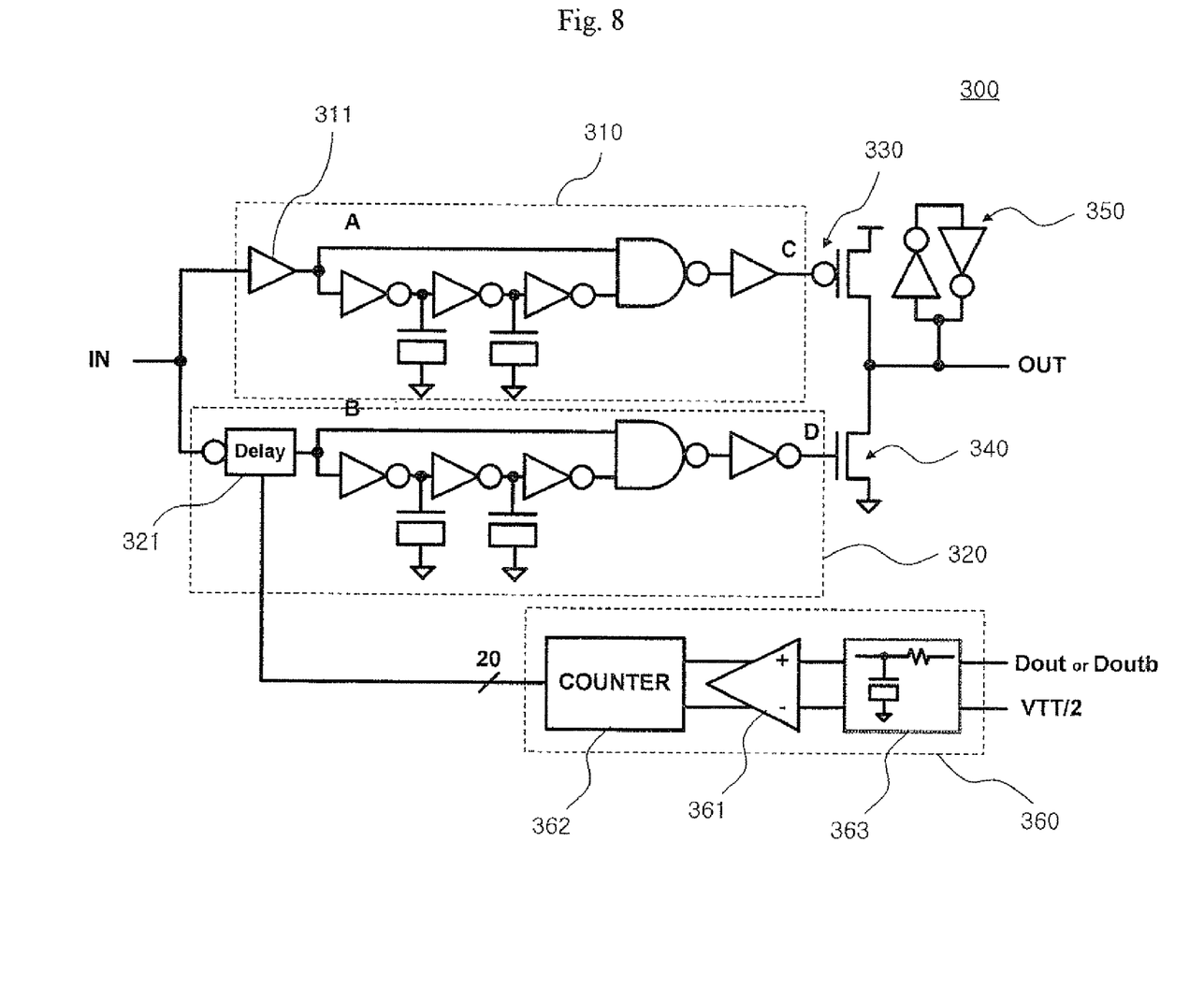
FIG. 8 is a view illustrating the configuration of a duty cycle correction circuit of the wired digital differential signal transmitter circuit in accordance with the embodiment of the present invention.
Figure 9:
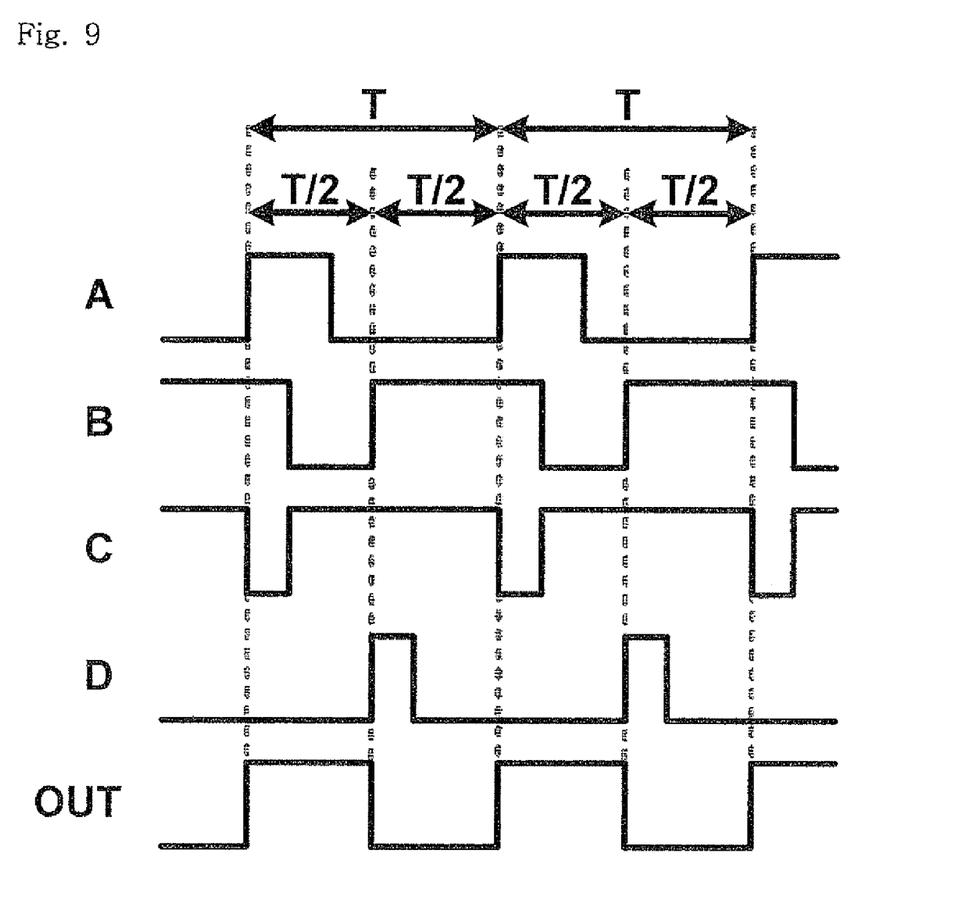
FIG. 9 is a timing diagram illustrating the operation of the duty cycle correction circuit according to the present invention.

FIG. 8 is a view illustrating the configuration of a duty cycle correction circuit of the wired digital differential signal transmitter circuit in accordance with the embodiment of the present invention, and FIG. 9 is a timing diagram illustrating the operation timing of the duty cycle correction circuit of the wired digital differential signal transmitter circuit in accordance with the embodiment of the present invention.

Referring to FIGS. 8 and 9, the duty cycle correction circuit (PRE_DCC) 300 includes edge detectors 310 and 320, MOS switches 330 and 340, a cross-coupled inverter 350, and a control circuit 360. The duty cycle correction circuit (PRE_DCC) 300 is inputted with the signal which is outputted from the differential phase correction circuit (PHASE ALIGN) 200 after having completely undergone phase correction, and corrects the duty cycle of the signal in response to the duty cycle correction activation signal CAL_PD so that pre-drivers on the two signal paths can maintain the signal integrity of the differential signals.

The input signal IN inputted to the duty cycle correction circuit (PRE_DCC) 300 is transmitted as signals A and B by a buffer 311 and a delay element (Delay) 321 which are respectively provided at the front ends of the edge detectors 310 and 320.

The edge detectors comprise a first edge detector 310 which has the buffer 311 at the front end thereof and a second edge detector 320 which has the delay element (Delay) 321 at the front end thereof. The edge detectors 310 and 320 include inverters and NAND gates which are connected to the output terminals of the buffer 311 and the delay element (Delay) 321.

The NAND gate provided to the first edge detector 310 has one input terminal to which the output of the buffer 311 is directly inputted and the other input terminal to which the output of the inverter is inputted. Also, the NAND gate provided to the second edge detector 320 has one input terminal to which the output of the delay element (Delay) 321 is directly inputted and the other input terminal to which the output of the inverter is inputted.

The edge detectors 310 and 320 detect the rising edges of the signals directly inputted from the buffer 311 and the delay element (Delay) 321 and the signals inputted through the inverters, and output signals C and D so that pulses for driving the MOS switches 330 and 340 are generated.

The MOS switches comprise a PMOS switch 330 having a gate to which the output signal C of the first edge detector 310 is applied, one terminal which is connected to a power source and the other terminal which is connected to an output terminal, and an NMOS switch 340 having a gate to which the output signal D of the second edge detector 320 is applied, one terminal which is connected to the output terminal and the other terminal which is connected to a ground source. The other terminal of the PMOS switch 330 and the one terminal of the NMOS switch 340 are connected with each other to output the signal OUT corrected in duty cycle to the final output section 400.

The output signal C of the first edge detector 310 is applied to the gate of the PMOS switch 330, and the output signal D of the second edge detector 320 is applied to the gate of the NMOS switch 340.

The PMOS switch 330 increases the output signal by the pulse of the signal C, and the NMOS switch 340 decreases the output signal by the pulse of the signal D. The output signal OUT, which is corrected by the duty cycle correction circuit (PRE_DCC) 300 in this way, is inputted to the final output section 400 of the transmitter circuit so as to transmit the final output signals Dout and Doutb.

It is preferred that at least one cross-coupled inverter 350 be connected to the common connection terminal of the PMOS switch 330 and the NMOS switch 340.

The control circuit 360 includes a comparator 361 and a counter (COUNTER) 362. The control circuit 360 compares a VTT/2 voltage corresponding to the 50% duty cycle of the final output signal Dout or Doutb and an average voltage of the final output signal calculated using a low pass filter 363, and controls the delay time to be delayed in the delay element (Delay) 321 so that the duty cycle of the final output signal of the transmitter circuit becomes 50%. The output terminal of the counter (COUNTER) 362 is connected to the delay element (Delay) 321 so as to control a delay time according to the comparison result of the comparator 361.

Through the operation of the control circuit 360 as describe above, the duty cycle correction circuit (PRE_DCC) 300 implements a duty cycle correction function so that the duty cycle of the outputs of the respective signal paths becomes 50% as is obtained from the results of duty cycle correction (DUTY CYCLE CORRECTION) shown in FIG. 5.

While it is illustrated in FIG. 5 that the duty cycle correction circuit (PRE_DCC) 300 is provided to one signal path and generates the output signal OUT corrected in duty cycle, it is to be readily understood that the same duty cycle correction circuit (PRE_DCC) 300 is provided to the other signal path and generates the complementary output signal OUTB corrected in duty cycle.

The output signals OUT and OUTB, which are outputted from the respective duty cycle correction circuits (PRE_DCC) 300 and are transmitted to the final output section 400, are described in FIG. 4 as the signals D and Db which are applied from the duty cycle correction circuits (PRE_DCC) 300 installed on the respective signal paths to input terminals IN and INB of the final output section 400. Therefore, the signals D and Db designate the output signals OUT and OUTB.

The output signals of the respective duty cycle correction circuits (PRE_DCC) 300 are not only transmitted to the final output section 400 but also applied as the input signals D and Db to the phase controller (PHASE CTRL) 250 so that phase correction can be confirmed and then the control code CTRL can be generated.

Figure 10:
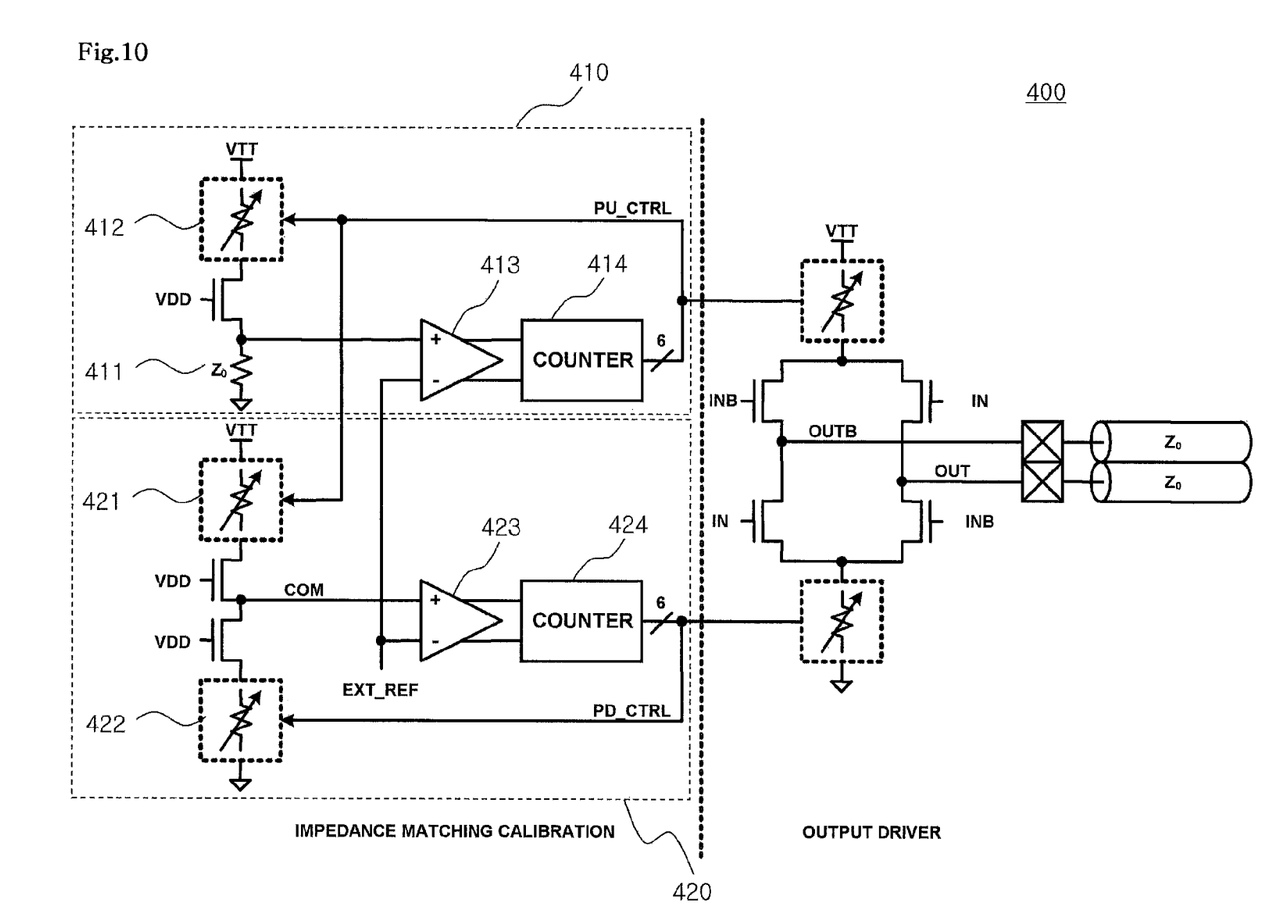
FIG. 10 is a view illustrating the configuration of a final output section of the wired digital differential signal transmitter circuit in accordance with the embodiment of the present invention.

FIG. 10 is a view illustrating the configuration of a final output section of the wired digital differential signal transmitter circuit in accordance with the embodiment of the present invention.

Referring to FIG. 10, the final output section 400 includes an impedance matching calibration circuit (IMPEDANCE MATCHING CALIBRATION) which is shown on the left side of the drawing and an output driver (OUTPUT DRIVER) which is shown on the right side of the drawing.

The impedance matching calibration circuit (IMPEDANCE MATCHING CALIBRATION) is composed of a pull-up calibration unit 410 which calibrates the impedance of a pull-up part arranged in the output driver using a reference resistor having the same impedance as the transmission lines, and a pull-down calibration unit 420 which calibrates the impedance of a pull-down part using the calibrated impedance of the pull-up part to be the same as the calibrated impedance of the pull-up part.

The pull-up calibration unit 410 includes a reference resistor (Z0) 411 which has the same impedance as the transmission lines and serves as a reference for impedance matching, a pull-up matching comparator 413 which compares an external reference signal EXT_REF with the voltage of one end of the reference resistor (Z0) 411, a pull-up matching counter (COUNTER) 414 which generates a pull-up control signal PU_CTRL for adjusting the value of a variable resistor provided to the pull-up part using the output of the pull-up matching comparator 413 and thereby implements impedance matching, a first half-replica 412 comprising a variable resistor which is commonly connected to the output terminal of the pull-up matching counter (COUNTER) 414, is inputted with the pull-up control signal PU_CTRL and is adjusted in impedance to be the same as that of the pull-up part, and a transistor having one terminal to which the variable resistor constituting the first half-replica 412 is connected, the other terminal to which the reference resistor (Z0) 411 is connected and a gate which is connected to the power source VDD.

The pull-up control signal PU_CTRL as the output of the pull-up matching counter (COUNTER) 414 is commonly applied to the variable resistor provided to the pull-up part and the first half-replica 412. The reference resistor (Z0) 411 is provided between the transistor and the ground source, and the variable resistor constituting the first half-replica 412 is provided between a power supply source VTT and the transistor.

Accordingly, the impedance of the pull-up part is calibrated to the value of the reference resistor (Z0) 411 using the reference resistor (Z0) 411, the first half-replica 412 and the transistor which constitute a C-1 region shaded in FIG. 10.

The pull-down calibration unit 420 includes a second half-replica 421 comprising a variable resistor which is adjusted in impedance by the pull-up control signal PU_CTRL in the same manner as in the pull-up part so that the impedance of the pull-down part becomes the same as the calibrated impedance of the pull-up part, a pull-down matching comparator 423, a pull-down matching counter (COUNTER) 424 which generates a pull-down control signal PD_CTRL for adjusting the value of a variable resistor provided to the pull-down part using the output of the pull-down matching comparator 423 and thereby implements impedance matching, a third half-replica 422 comprising a variable resistor which is commonly connected to the output terminal of the pull-down matching counter (COUNTER) 424, is inputted with the pull-down, control signal PD_CTRL and is adjusted in impedance to be the same as the pull-down part, and transistors which are arranged between the second half-replica 421 and the third half-replica 422.

The pull-down control signal PD_CTRL is commonly applied to the variable resistor provided to the pull-down part and the third half-replica 422. The second half-replica 421 is arranged between the power supply source VTT and one terminal of one transistor, and the third half-replica 422 is arranged between the other terminal of the other transistor and the ground source VSS. The common terminal of the two transistors which are provided between the second and third half-replicas 421 and 422 is connected to the input terminal of the pull-down matching comparator 423 to be compared with the external reference signal EXT_REF.

Accordingly, the impedance of the pull-down part is calibrated to be the same as the impedance of the pull-up part calibrated by the pull-up calibration unit 410, using the second and third half-replicas 421 and 422 and the two transistors which constitute a C-2 region shaded in FIG. 10.

Thus, when the impedance calibration is completed in these ways by the pull-up calibration unit 410 and the pull-down calibration unit 420, the impedances of the pull-up part and the pull-down part arranged in the output driver (OUTPUT DRIVER) are matched with the impedance of the transmission lines to be the same.

The output driver (OUTPUT DRIVER) transmits the signals which have completely undergone the phase correction and the duty cycle correction, through the transmission lines. The output driver (OUTPUT DRIVER) includes four switches which comprise NMOS transistors and the variable resistors which are calibrated by the impedance matching calibration circuit (IMPEDANCE MATCHING CALIBRATION). All the four switches having output terminals, which are connected to the variable resistors having input impedance matched by the impedance matching calibration circuit (IMPEDANCE MATCHING CALIBRATION) and transmit the differential input signals IN and MB as output differential signals OUT and OUTB, comprise NMOS transistors.

In the conventional wired digital differential signal transmitter, the final output section is configured in the form of a CMOS inverter. In the case of a PMOS switch, if a voltage between a source terminal and a gate is less than a threshold voltage, the operational performance of the PMOS switch as a switch markedly deteriorates. Hence, due to the operational characteristics of the PMOS switch which performs pull-up operation, the supply voltage of the final output section cannot be reduced below the absolute value of the threshold voltage of the PMOS switch. Also, even when the supply voltage is reduced close to the absolute value of the threshold voltage of the PMOS switch, the operational performance of the PMOS switch greatly deteriorates under this condition, whereby substantial limitations exist in ensuring high speed operation.

In the wired digital differential signal transmitter circuit according to the present invention, as can be readily seen from FIG. 10, because the switches which perform the pull-up operation in the output driver (OUTPUT DRIVER) comprise NMOS switches similar to the switches which perform the pull-down operation, the supply voltage of the final output section can be reduced, whereby power consumption can be minimized.

Also, in the conventional wired digital differential signal transmitter, since transmission of differential signals is implemented by individual CMOS inverters, it seems as if not a differential signal transmitter but a pair of single signal transmitters are used.

In the output driver of the wired digital differential signal transmitter according to the present invention, as shown in FIG. 10, because each of the circuits constituting the pull-up part and the pull-down part is composed of the variable resistor and two NMOS switches to define a kind of differential pair and the output driver itself maintains the signal integrity of the differential signals, the present invention can be appropriately and advantageously applied to a wired digital differential signal transmitter circuit.

Figure 11:
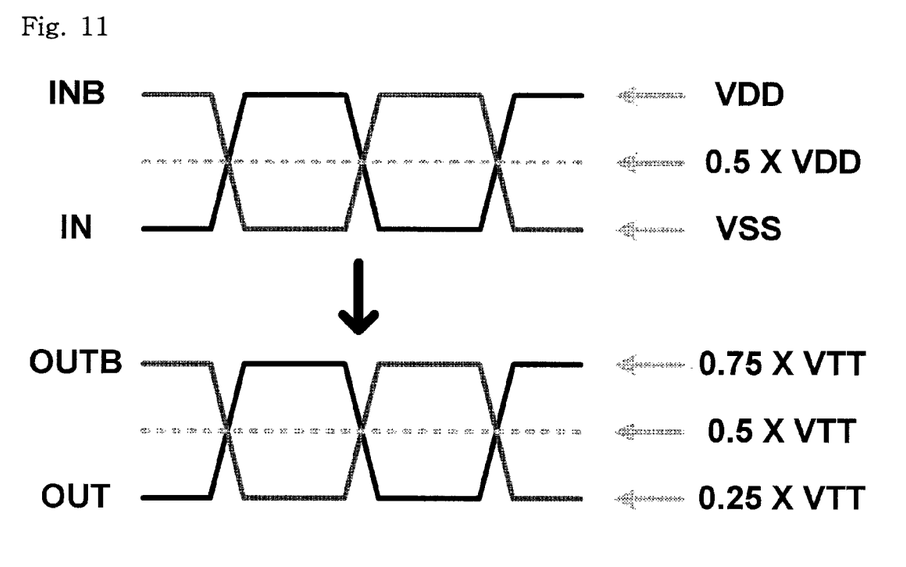
FIG. 11 is a timing diagram illustrating the operation of the final output section according to the present invention.

FIG. 11 is a timing diagram illustrating the operation timing of the final output section of the wired digital differential signal transmitter circuit in accordance with the embodiment of the present invention.

Referring to FIG. 11, in the final output section of the wired digital differential signal transmitter circuit according to the present invention, the outputs of pre-drivers for the input signals IN and IND, which are driven with an amplitude measured between a first source VDD and a second source VSS, are outputted as the output signals OUT and OUTB which have an amplitude of 0.5×VTT while being centered on 0.5×VTT.

Therefore, the input signals IN and INB, which are inputted to the final output section after phases thereof are corrected by the differential phase correction circuit and duty cycles thereof are corrected by the duty cycle correction circuits to a duty cycle of 50%, are outputted as the output signals OUT and OUTS which are centered on 0.5×VTT and have a maximum value of 0.75×VTT and a minimum value of 0.25×VTT. At this time, since the supply voltage VTT of the final output section is a voltage which is less than the supply voltage VDD of the pre-drivers, the supply voltage of the final output section can be lowered.

Figure 12:
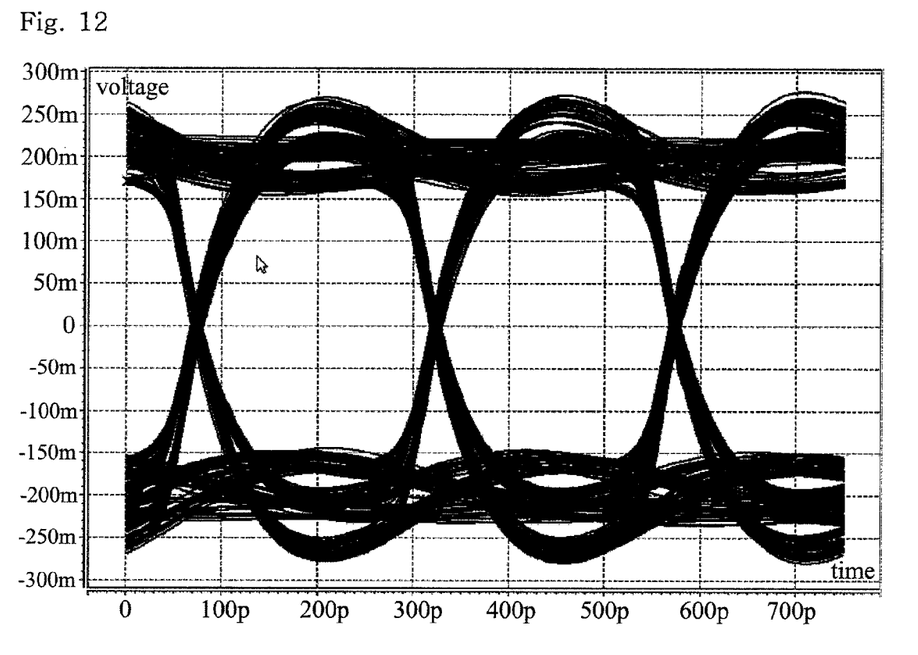
FIG. 12 is an eye diagram showing the simulation results for the wired digital differential signal transmitter circuit in accordance with the embodiment of the present invention.

FIG. 12 is an eye diagram showing the simulation results for the wired digital differential signal transmitter circuit in accordance with the embodiment of the present invention.

Simulations were performed under conditions including differential signal inputs of 4 Gbps pseudo random binary sequence (PRBS), 1.2V VDD, 0.4V VTT and transmission line resistance of 500 using HSPICE. Referring to FIG. 12, in the wired digital differential signal transmitter circuit according to the present invention, due to the fact that, after the phases of input signals are corrected by the differential phase correction circuit to have a phase difference of 180° and the duty cycles of the input signals are corrected by the duty cycle correction circuits to have a duty cycle of 50%, output signals are outputted from the final output section through impedance matching, it can be confirmed that the final output signals can be represented as more perfect differential signals.

As is apparent from the above description, in the present invention, advantages are provided in that, since a differential phase correction circuit and duty cycle correction circuits are installed on two signal paths, the distortion of differential signals can be compensated for and the signal integrity of digital differential signals can be improved.

Also, in the present invention, advantages are provided in that, since a final output section of a transmitter circuit is composed of only NMOS transistors, a supply voltage can be decreased and power consumption can be significantly reduced, and since impedance changes of transmission lines are immediately reflected, impedance matching can be accomplished.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A digital differential signal transmitter circuit for a low supply voltage, comprising:
    signal selection switches composed of multiplexers which are respectively installed on two signal paths to select and output to the respective signal paths any ones of input differential signals and clock signals;
    a differential phase correction circuit arranged between the two signal paths to be inputted with signals outputted from the two signal paths, delay output timing and correct a phase difference between two signals;
    duty cycle correction circuits configured to detect edges of signals transmitted from the respective signal paths after phase correction is implemented, generate pulses, and control a switch for increasing and decreasing an output signal by the pulses so that duty cycles of signals outputted from the respective signal paths are corrected to be constant; and
    a final output section configured to match an impedance of an output driver using a reference resistor having the same impedance as transmission lines for transmitting the input differential signals to a receiver, and output the input differential signals corrected in duty cycles to the transmission lines,
    wherein the signal selection switches are configured to output the clock signals while phase difference correction and duty cycle correction are implemented in response to a correction function activation signal.

2. A digital differential signal transmitter circuit for a low supply voltage, comprising:
    signal selection switches composed of multiplexers which are respectively installed on two signal paths to select and output to the respective signal paths any ones of input differential signals and clock signals;
    a differential phase correction circuit arranged between the two signal paths to be inputted with signals outputted from the two signal paths, delay output timing and correct a phase difference between two signals;
    duty cycle correction circuits configured to detect edges of signals transmitted from the respective signal paths after phase correction is implemented, generate pulses, and control a switch for increasing and decreasing an output signal by the pulses so that duty cycles of signals outputted from the respective signal paths are corrected to be constant; and
    a final output section configured to match an impedance of an output driver using a reference resistor having the same impedance as transmission lines for transmitting the input differential signals to a receiver, and output the input differential signals corrected in duty cycles to the transmission lines,
    wherein the differential phase correction circuit comprises variable delays which are inputted with and delay signals outputted from the signal selection switches on the two signal paths, respectively, such that two signals have a phase difference of 180°,
    wherein the differential phase correction circuit further comprises a phase controller which is fed back with signals outputted from the duty cycle correction circuits and generates control codes for the variable delays.

3. The digital differential signal transmitter circuit according to claim 2, wherein the variable delays are provided for respective signal paths, one of the variable delays increases a delay time of an output signal by one control code outputted from the phase controller, and the other of the variable delays decreases a delay time of an output signal by the other control code having complementariness with respect to the one control code.

4. The digital differential signal transmitter circuit according to claim 2, wherein the duty cycle correction circuit comprises:
    edge detectors configured to detect rising edges of signals inputted from the differential phase correction circuit and generate pulses;
    MOS switches composed of a PMOS switch which increases an output signal to be transmitted to the final output section using the pulses generated by the edge detectors and an NMOS switch which decreases an output signal to be transmitted to the final output section using the pulses;
    a cross-coupled inverter connected to an output terminal which is commonly connected to the PMOS switch and the NMOS switch; and
    a control circuit having a comparator and a counter which control a delay time to be delayed in the edge detectors so that a duty cycle of a final output in the transmitter circuit becomes 50%.

5. The digital differential signal transmitter circuit according to claim 4, wherein the edge detectors comprise:
    a first edge detector having a buffer which receives a signal inputted from the differential phase correction circuit, and a NAND gate which has one input terminal to which an output of the buffer is directly inputted and the other input terminal to which the output of the buffer is inputted via inverters; and
    a second edge detector having a delay element which is commonly connected to an input terminal of the buffer and receives the signal inputted from the differential phase correction circuit, and a NAND gate which has one input terminal to which an output of the delay element is directly inputted and the other input terminal to which the output of the delay element is inputted via inverters.

6. The digital differential signal transmitter circuit according to claim 5,
wherein the PMOS switch has a gate to which a signal outputted from the first edge detector is applied, one terminal which is connected to a power source and the other terminal which is connected to an output terminal of the duty cycle correction circuit, and
wherein the NMOS switch has a gate to which a signal outputted from the second edge detector is applied, one terminal which is connected to the other terminal of the PMOS switch so as to be connected to the output terminal of the duty cycle correction circuit and the other terminal which is connected to a ground source.

7. The digital differential signal transmitter circuit according to claim 6, wherein the control circuit compares a VTT/2 voltage corresponding to a 50% duty cycle of the final output outputted from the transmitter circuit and an average voltage of the final output calculated using a low pass filter, and controls the delay time to be delayed in the edge detectors so that a duty cycle of the final output of the transmitter circuit becomes 50%.

8. The digital differential signal transmitter circuit according to claim 7, wherein an output terminal of the counter is connected to the delay element which is provided in the second edge detector.

9. A digital differential signal transmitter circuit for a low supply voltage, comprising:
signal selection switches composed of multiplexers which are respectively installed on two signal paths to select and output to the respective signal paths any ones of input differential signals and clock signals;
a differential phase correction circuit arranged between the two signal paths to be inputted with signals outputted from the two signal paths, delay output timing and correct a phase difference between two signals;
duty cycle correction circuits configured to detect edges of signals transmitted from the respective signal paths after phase correction is implemented, generate pulses, and control a switch for increasing and decreasing an output signal by the pulses so that duty cycles of signals outputted from the respective signal paths are corrected to be constant; and
a final output section configured to match an impedance of an output driver using a reference resistor having the same impedance as transmission lines for transmitting the input differential signals to a receiver, and output the input differential signals corrected in duty cycles to the transmission lines,
wherein the final output section comprises:
an impedance matching calibration circuit having a pull-up calibration unit which calibrates an impedance of a pull-up part arranged in an output driver using a reference resistor having the same impedance as the transmission lines, and a pull-down calibration unit which calibrates an impedance of a pull-down part using the calibrated impedance of the pull-up part to be the same as the calibrated impedance of the pull-up part; and
an output driver configured to transmit signals having undergone phase correction and duty cycle correction through transmission lines, and having four switches which comprise NMOS transistors and variable resistors which are calibrated by the impedance matching calibration circuit.

10. The digital differential signal transmitter circuit according to claim 9, wherein the pull-up calibration unit comprises:
a reference resistor having the same impedance as the transmission lines and serving as a reference for impedance matching;
a comparator configured to compare an external reference signal with a voltage of one end of the reference resistor;
a pull-up matching counter configured to generate a pull-up control signal for adjusting a value of a variable resistor provided to the pull-up part using an output of the comparator and thereby implement impedance matching;
a first half-replica comprising a variable resistor which is commonly connected to an output terminal of the pull-up matching counter, is inputted with the pull-up control signal and is adjusted in impedance to be the same as that of the pull-up part; and
a transistor having one terminal to which the variable resistor constituting the first half-replica is connected, the other terminal to which the reference resistor is connected and a drain which is connected to the power source.

11. The digital differential signal transmitter circuit according to claim 10, wherein the pull-up control signal as an output of the pull-up matching counter is commonly applied to the variable resistor provided to the pull-up part and the first half-replica, the reference resistor is provided between the transistor and the ground source, and the variable resistor constituting the first half-replica is provided between a power supply source VTT and the transistor.

12. The digital differential signal transmitter circuit according to claim 11, wherein the pull-down calibration unit comprises:
a second half-replica comprising a variable resistor which is adjusted in impedance by the pull-up control signal in the same manner as in the pull-up part so that an impedance of the pull-down part becomes the same as the calibrated impedance of the pull-up part;
a comparator;
a pull-down matching counter configured to generate a pull-down control signal for adjusting a value of a variable resistor provided to the pull-down part using an output of the comparator and thereby implement impedance matching;
a third half-replica comprising a variable resistor which is commonly connected to an output terminal of the pull-down matching counter, is inputted with the pull-down control signal and is adjusted in impedance to be the same as the pull-down part; and
transistors arranged between the second half-replica and the third half-replica.

13. The digital differential signal transmitter circuit according to claim 12, wherein the pull-down control signal PD_CTRL is commonly applied to the variable resistor provided to the pull-down part and the third half-replica, the second half-replica is arranged between the power supply source VTT and one terminal of one transistor, the third half-replica is arranged between the other terminal of the other transistor and the ground source, and a common terminal of two transistors, which are provided between the second and third half-replicas, is connected to an input terminal of the comparator to be compared with the external reference signal.

14. The digital differential signal transmitter circuit according to claim 9, wherein the output driver is configured to output input signals, which are driven with an amplitude measured between a first source VDD and a second source VSS, as output signals, which are centered on 0.5×VTT and have a maximum value of 0.75×VTT and a minimum value of 0.25×VTT so as to have an amplitude of 0.5×VTT.

15. The digital differential signal transmitter circuit according to claim 1, wherein the final output section comprises:
   an impedance matching calibration circuit having a pull-up calibration unit which calibrates an impedance of a pull-up part arranged in an output driver using a reference resistor having the same impedance as the transmission lines, and a pull-down calibration unit which calibrates an impedance of a pull-down part using the calibrated impedance of the pull-up part to be the same as the calibrated impedance of the pull-up part; and
   an output driver configured to transmit signals having undergone phase correction and duty cycle correction through transmission lines, and having four switches which comprise NMOS transistors and variable resistors which are calibrated by the impedance matching calibration circuit.

16. The digital differential signal transmitter circuit according to claim 2, wherein the final output section comprises:
   an impedance matching calibration circuit having a pull-up calibration unit which calibrates an impedance of a pull-up part arranged in an output driver using a reference resistor having the same impedance as the transmission lines, and a pull-down calibration unit which calibrates an impedance of a pull-down part using the calibrated impedance of the pull-up part to be the same as the calibrated impedance of the pull-up part; and
   an output driver configured to transmit signals having undergone phase correction and duty cycle correction through transmission lines, and having four switches which comprise NMOS transistors and variable resistors which are calibrated by the impedance matching calibration circuit.

17. The digital differential signal transmitter circuit according to claim 3, wherein the final output section comprises:
   an impedance matching calibration circuit having a pull-up calibration unit which calibrates an impedance of a pull-up part arranged in an output driver using a reference resistor having the same impedance as the transmission lines, and a pull-down calibration unit which calibrates an impedance of a pull-down part using the calibrated impedance of the pull-up part to be the same as the calibrated impedance of the pull-up part; and
   an output driver configured to transmit signals having undergone phase correction and duty cycle correction through transmission lines, and having four switches which comprise NMOS transistors and variable resistors which are calibrated by the impedance matching calibration circuit.

18. The digital differential signal transmitter circuit according to claim 1, wherein the differential phase correction circuit comprises variable delays which are inputted with and delay signals outputted from the signal selection switches on the two signal paths, respectively, such that two signals have a phase difference of 180°.

19. The digital differential signal transmitter circuit according to claim 9, wherein the differential phase correction circuit comprises variable delays which are inputted with and delay signals outputted from the signal selection switches on the two signal paths, respectively, such that two signals have a phase difference of 180°.

20. The digital differential signal transmitter circuit according to claim 9, wherein the signal selection switches are configured to output the clock signals while phase difference correction and duty cycle correction are implemented in response to a correction function activation signal.

\* \* \* \* \*